United States Patent
Lim et al.

(10) Patent No.: US 10,542,242 B2
(45) Date of Patent: Jan. 21, 2020

(54) DISPLAY DEVICE AND METHOD FOR CONTROLLING SAME

(71) Applicant: Samsung Electronics Co., Ltd., Suwon-si (KR)

(72) Inventors: Tae-gyu Lim, Seoul (KR); Woo-seok Kang, Suwon-si (KR); Seung-hoon Han, Seoul (KR); Young-su Moon, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/754,714

(22) PCT Filed: Sep. 29, 2016

(86) PCT No.: PCT/KR2016/010919
§ 371 (c)(1),
(2) Date: Feb. 23, 2018

(87) PCT Pub. No.: WO2017/057926
PCT Pub. Date: Apr. 6, 2017

(65) Prior Publication Data
US 2018/0262727 A1  Sep. 13, 2018

Related U.S. Application Data

(60) Provisional application No. 62/234,955, filed on Sep. 30, 2015.

(51) Int. Cl.
*H04N 9/31* (2006.01)
*H04N 9/77* (2006.01)
(Continued)

(52) U.S. Cl.
CPC ......... *H04N 9/3179* (2013.01); *H04N 5/9305* (2013.01); *H04N 9/64* (2013.01); *H04N 9/77* (2013.01); *H04N 21/84* (2013.01)

(58) Field of Classification Search
None
See application file for complete search history.

(56) References Cited

U.S. PATENT DOCUMENTS 8,248,494 B2   8/2012  Du et al.
8,300,051 B2  10/2012  Kim et al.
(Continued)

FOREIGN PATENT DOCUMENTS

CN  1672402    9/2005
CN  103210418  7/2013
(Continued)

OTHER PUBLICATIONS

International Search Report dated Jan. 17, 2017 in corresponding International Patent Application No. PCT/KR2016/010919.
(Continued)

*Primary Examiner* — Janese Duley
(74) *Attorney, Agent, or Firm* — Staas & Halsey LLP

(57) ABSTRACT

A display apparatus which processes and displays an image signal and a method of controlling the same are provided. The method includes receiving an image data, dividing the received image data into an image signal into an image signal and a metadata, and acquiring information relating to an area of interest by using the metadata and performing a high dynamic range (HDR) processing with respect to the area of interest by using the acquired information relating to the area of interest.

13 Claims, 15 Drawing Sheets

(51) Int. Cl.
*H04N 5/93* (2006.01)
*H04N 9/64* (2006.01)
*H04N 21/84* (2011.01)

(56) References Cited

U.S. PATENT DOCUMENTS

| | | |
|---|---|---|
| 8,610,738 B2 | 12/2013 | Choe et al. |
| 8,675,010 B2 | 3/2014 | Cho et al. |
| 9,894,422 B2 | 2/2018 | Hwang et al. |
| 2003/0112867 A1* | 6/2003 | Hannuksela ......... H04N 19/174 375/240.08 |
| 2003/0202589 A1 | 10/2003 | Reitmeier et al. |
| 2005/0104900 A1 | 5/2005 | Toyama et al. |
| 2006/0104508 A1 | 5/2006 | Daly et al. |
| 2009/0179998 A1 | 7/2009 | Steinberg et al. |
| 2010/0085361 A1 | 4/2010 | Kim et al. |
| 2010/0164976 A1 | 7/2010 | Choe et al. |
| 2012/0262600 A1 | 10/2012 | Velarde et al. |
| 2012/0268557 A1 | 10/2012 | Kim et al. |
| 2013/0235072 A1* | 9/2013 | Longhurst ................ H04N 1/46 345/605 |
| 2015/0117791 A1* | 4/2015 | Mertens ............... H04N 19/176 382/239 |
| 2015/0156469 A1 | 6/2015 | Qu et al. |
| 2015/0201222 A1 | 7/2015 | Mertens |
| 2015/0222916 A1 | 8/2015 | Su et al. |
| 2016/0065861 A1* | 3/2016 | Steinberg ........... G06K 9/00228 348/239 |
| 2016/0337706 A1* | 11/2016 | Hwang ............ H04N 21/23614 |
| 2018/0115806 A1 | 4/2018 | Hwang et al. |

FOREIGN PATENT DOCUMENTS

| | | |
|---|---|---|
| CN | 104471939 | 3/2015 |
| EP | 1 379 080 A1 | 1/2004 |
| EP | 1 833 243 A1 | 9/2007 |
| JP | 2010-252128 | 11/2010 |
| KR | 10-2010-0076455 | 7/2010 |
| KR | 10-2010-0039664 | 4/2011 |
| KR | 10-2011-0111251 | 10/2011 |
| KR | 10-2012-0119173 | 10/2012 |
| KR | 10-2015-0002440 | 1/2015 |
| KR | 10-1520069 | 5/2015 |
| KR | 10-1537182 | 7/2015 |
| TW | 492255 | 6/2002 |
| WO | WO 2012/071235 A1 | 5/2012 |
| WO | WO 2014/009844 A1 | 1/2014 |
| WO | WO 2015/126144 A1 | 8/2015 |

OTHER PUBLICATIONS

Written Opinion of the International Searching authority dated Jan. 17, 2017 in corresponding International Patent Application No. PCT/KR2016/010919.
Extended European Search Report dated Aug. 28, 2018 in European Patent Application No. 16852072.4.
Korean Office Action dated Sep. 18, 2018 in Korean Patent Application No. 10-2017-7036206.
Chinese Office Action dated Aug. 14, 2019 in corresponding Chinese Patent Application No. 201680055996.3.

* cited by examiner

DISPLAY DEVICE AND METHOD FOR CONTROLLING SAME

CROSS-REFERENCE TO RELATED APPLICATIONS

This application is a U.S. National Stage Application which claims the benefit under 35 U.S.C. § 371 of International Patent Application No. PCT/KR2016/010919, filed on Sep. 29, 2016, which claims the priority benefit of U.S. Provisional Patent Application No. 62/234,955, filed on Sep. 30, 2015 in the United States Patent and Trademark Office, the disclosures of which are hereby incorporated by reference in their entirety.

TECHNICAL FIELD

Apparatuses and methods consistent with example embodiments relate to a display apparatus and a method of controlling the same, and more particularly, to a display apparatus which performs an HDR processing with respect to a particular area by using metadata of the received image data, and a controlling method thereof.

DESCRIPTION OF RELATED ART

In a natural environment, the range of brightness is very wide. For example, the range of brightness from very dark scenes such as the night sky to very bright scenes such as sunlight is very wide. In particular, there are many cases where a scene has a wide dynamic range from a very dark portion to a very bright portion.

However, at present, due to the limitation of the maximum brightness that can be expressed by a general display apparatus and the restriction of the expressiveness of the input signal transmitted to the display apparatus, it is difficult to actually express the dynamic range or the corresponding brightness ratio that the human visual system can feel while observing the natural environment. Alternatively, there is a case where the dynamic range of the image generating apparatus such as a camera is narrower than the dynamic range that the display apparatus can express.

If the dynamic range that the image generating apparatus and the display apparatus can represent are different, image quality distortion may occur. In order to minimize image quality distortion, there is a problem that high cost is required to perform various mapping such as tone mapping, saturation mapping, and the like.

Therefore, there is a need for a processing technique for minimizing the image quality distortion and the implementation cost and a technique for improving the HDR effect.

DETAILED DESCRIPTION

Technical Problem

One or more example embodiments provide a display apparatus which performs an HDR processing of an area of interest by using a front view and background information of the area of interest by analyzing the received metadata of the image data, and a method of controlling the same.

Solution to Problem

According to an aspect of an example embodiment, there is provided a method of controlling a display apparatus which processes and displays an image signal, the method comprising: receiving an image data; dividing the received image data into an image signal into an image signal and a metadata; and acquiring information relating to an area of interest by using the metadata and performing a high dynamic range (HDR) processing with respect to the area of interest by using the acquired information relating to the area of interest.

The information relating to the area of interest may include a coordinate corresponding to the area of interest and color range information relating to a front view and background included in the area of interest.

the performing the HDR processing may include identifying relating to a plurality of pixels included in the area of interest by using color range information relating to a front view and background included in the area of interest; and adjusting a plurality of pixel values included in the area of interest according to information relating to the plurality of pixels.

The information relating to the pixel may include information indicating which group from among a first group corresponding to a background, a second group corresponding to a front view, and a third group corresponding to a mixture of a front view and a background the plurality of pixels belong to.

The adjusting the plurality of pixel values may include adjusting at least one from among a tone or a saturation by performing at least one from among a tone mapping and a saturation mapping with respect to the plurality of pixels.

The coordinate corresponding to the area of interest may be a coordinate with respect to a predetermined shape including a main object of the image data.

The coordinate corresponding to the area of interest may be a coordinate with respect to a shape generated by enlarging a predetermined shape including a main object of the image data by a predetermined ratio.

The color range information may include information relating to a range of at least one of maxRGB, red (R), green (G), and blue (B).

According to an aspect of an example embodiment, there is provided a display apparatus which processes and displays an image signal, comprising: an image receiver configured to receive an image data; a decoder configured to divide the received image data into an image signal and metadata; and an image processor configured to acquire information relating to an area of interest by using the metadata and to perform a high dynamic range (HDR) processing with respect to the area of interest by using the acquired information relating to the area of interest.

The information relating to the area of interest may include a coordinate corresponding to the area of interest and color range information relating to a front view and background included in the area of interest.

The image processor may be further configured to identify information relating to a plurality of pixels included in the area of interest by using color range information relating to a front view and background included in the area of interest, and to adjust a plurality of pixel values included in the area of interest according to information relating to the plurality of pixels.

The information relating to the pixel may include information indicating which group from among a first group corresponding to a background, a second group corresponding to a front view, and a third group corresponding to a mixture of a front view and a background the plurality of pixels belong to.

The image processor may adjust at least one from among a tone and a saturation by performing at least one from among a tone mapping and a saturation mapping with respect to the plurality of pixels.

The coordinate corresponding to the area of interest may be a coordinate with respect to a predetermined shape including a main object of the image data.

The coordinate corresponding to the area of interest may be a coordinate with respect to a shape generated by enlarging a predetermined shape including a main object of the image data by a predetermined ratio.

The color range information may include information relating to a range of at least one of maxRGB, red (R), green (G), and blue (B).

Effect of the Invention

As described above, according to various example embodiments, it is possible to provide a display apparatus and a method of controlling the same for displaying an image on which HDR processing has been performed for an area of interest.

PREFERRED EMBODIMENTS FOR CARRYING OUT THE INVENTION

Figure 1:
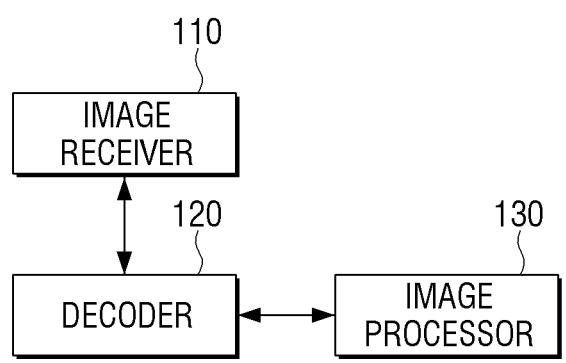
FIG. 1 is a block diagram schematically illustrating the configuration of a display apparatus, according to an example embodiment.

Terms used in the description of the various example embodiments of the present disclosure are briefly described and then the various example embodiments of the present disclosure will be described in greater detail.

The terms used in the example embodiments of the present disclosure are general terms which are widely used now and selected considering the functions of the present disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Therefore, terms used in the present disclosure may be defined based on a meaning of the terms and contents described in the present disclosure, not simply based on names of the terms.

In the present disclosure, terms including an ordinal number such as 'first', 'second', etc. may be used to describe various components, but the components are not to be construed as being limited to the terms. The terms are only used to differentiate one component from other components. For example, the 'first' component may be named the 'second' component, and vice versa, without departing from the scope of the present disclosure. The term 'and/or' includes a combination of a plurality of items or any one of a plurality of terms.

Further, in the present disclosure, singular forms used in the specification are intended to include plural forms unless the context clearly indicates otherwise.

Further, it will be further understood that the terms "comprises" or "have" used in the present disclosure, specify the presence of stated features, numerals, steps, operations, components, parts mentioned in this specification, or a combination thereof, but do not preclude the presence or addition of one or more other features, numerals, steps, operations, components, parts, or a combination thereof.

Further, in the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor.

Further, in the present disclosure, a case in which any one part is connected with the other part includes a case in which the parts are directly connected with each other and a case in which the parts are electrically connected with each other with other elements interposed therebetween.

Further, in the present disclosure, an input, e.g., a user input, may include at least one of a touch input, a bending input, a speech input, a button input, and a multimodal input, but is not limited thereto.

Unless indicated otherwise, it is to be understood that all the terms used in the disclosure including technical and scientific terms has the same meaning as those that are understood by those who skilled in the art. The terms defined in a generally used dictionary should be interpreted as having the same meanings as the contextual meanings of the relevant technology and should not be interpreted as having ideal or exaggerated meanings unless they are clearly defined in the various exemplary embodiments.

In addition, a high dynamic range (HDR) of an image signal according to an example embodiment may refer to an intention for vividly expressing an object by a user when an image data is generated, information relating to an image photographing environment, and image addition information to be expressed to correspond to a specification of a display apparatus.

In addition, in an example embodiment, an area of interest may be an area including a main object. In addition, a front view may be an area corresponding to the main object from among the area of interest. A background may be an area which does not correspond to the main object from among the area of interest.

Hereinafter, the present disclosure will be described in greater detail with reference to the accompanying drawings. FIG. 1 is a block diagram illustrating an example configuration of the display apparatus 100 according to an example embodiment of the present disclosure. As illustrated in FIG. 1, a display apparatus 100 may include an image receiver 110, a decoder 120, and an image processor 130. According to an example embodiment, the display apparatus 100 may be realized as various electronic apparatuses such as smart TV, desktop PC, smart phone, tablet PC, notebook PC, set-top box, etc.

The image receiver 110 may receive image data from an external device. For example, the image processor 110 may receive an image packet encoded from an external device or may receive a bit stream. In addition, the image processor 110 may wirelessly receive a radio frequency (RF) signal from a broadcasting station, or may receive an image signal, which complies with composite video, component video, super video, SCART, and high definition multimedia interface (HDMI) and society of motion picture & television engineers (SMPTE) standards, etc., by wire. Alternatively, the image processor 110 may receive a data packet of a web content by accessing a web server. Depending on circumstances, the image processor 110 may receive a three-dimensional image signal that includes a two-dimensional image signal including metadata and a three-dimensional image signal including a metadata.

The decoder 120 may decode the received image data and separate the image signal from the metadata. For example, in response to an image data including metadata being received via the image receiver 110, the decoder 120 may parse a message included in the received image data and acquire metadata. In addition, the decoder 120 may separate a metadata with respect to the entire area and a metadata with respect to an area of interest from the acquired metadata. The metadata with respect to the entire area and metadata with respect to the area of interest acquired from the decoder 120 may include HDR information. In this regard, the HDR information may be received when the image data is generated, but is not limited thereto, and may be received via a wired/wireless network. In addition, the area of interest is an area including a main object, and may be designated by the user.

The image processor 130 may acquire information relating to the area of interest by using the metadata acquired via the decoder 120. In addition, the image processor 130 may perform an HDR processing with respect to the area of interest by using the acquired information relating to the area of interest.

For example, the image processor 130 may acquire information relating to the area of interest by using the metadata acquired via the decoder 120. In this regard, the information relating to the area of interest may include a coordinate corresponding to the area of interest, a color range information relating to a front view included in the area of interest and color range information relating to the background, to represent the area corresponding to the area of interest. For example, the coordinate corresponding to the area of interest may be a coordinate with respect to a predetermined shape including the main object, or may be a coordinate with respect to a shape generated by enlarging a predetermined shape including the main object by a predetermined ratio. For example, the coordinate corresponding to the area of interest may be [(Xmin,Ymax),(Xmax,Ymin)] for representing a bounding box including the main object, or may be a coordinate corresponding to a shape generated by enlarging the bounding box including the main object by 10% in both length and width. In addition, the color range information with respect to the front view and background included in the area of interest may include information relating to at least one range from among maxRGB, red (R), green (G), and blue (B). In addition, the color range information with respect to the front view and background included in the area of interest may be information relating to a hue saturation value (HSV) and an Ycbcr range.

In addition, the image processor 130 may identify information relating to a plurality of pixels included in the area of interest by using color range information with respect to the front view and background included in the area of interest. In particular, the image processor 130 may identify whether a plurality of pixels included in the area of interest corresponds to a background, a front view or a mixed area of the background and the front view, using the color range information with respect to the front view and background included in the area of interest.

In addition, the image processor 130 may adjust a plurality of pixel values included in the area of interest based on information relating to the plurality of pixels. In particular, the image processor 130 may perform at least one from among a tone mapping or a saturation mapping with respect to a plurality of pixels included in the area of interest based on the information relating to the plurality of pixels and adjust at least one from among a tone or saturation of the plurality of pixels. The tone mapping may be a non-linear mapping of the output pixel to a luma value with respect to the luma value of the input pixel. The saturation mapping may be a non-linear mapping of the output pixel to a sharpness value with respect to the sharpness value of the input pixel. The tone mapping and the saturation mapping may be performed to match the received image data to the specification of the display apparatus, the viewing condition, and the user preference characteristics, and the global tone/saturation mapping refers to that a processing is applied to all pixels. In addition, the local tone/saturation mapping refers to that a processing applied to some pixels, in particular, a pixel corresponding to the area of interest.

Figure 2:
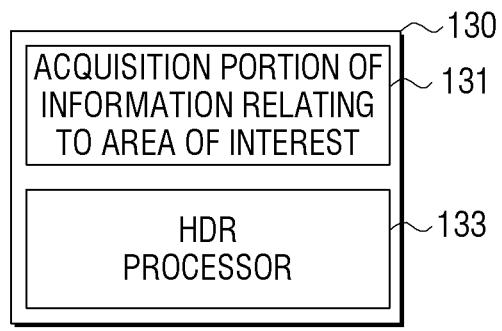
FIG. 2 is a block diagram schematically illustrating the configuration of an image processor included in the display apparatus, according to an example embodiment.

FIG. 2 is a block diagram illustrating configuration of the image processor 130 included in the display apparatus 100 briefly according to an exemplary embodiment. As illustrated in FIG. 2, the image processor 130 includes an acquisition portion of information relating to an area of interest 131 and an HDR processor 133.

The acquisition portion of information relating to an area of interest 131 may acquire information relating to the area of interest. For example, the acquisition portion of information relating to an area of interest 131 may acquire a coordinate corresponding to the area of interest and color range information relating to a front view and background included in the area of interest by using the metadata acquired from the decoder 120.

The HDR processor 133 may perform an HDR processing of the area of interest by using the metadata relating to the area of interest. For example, the HDR processor 133 may acquire the HDR information by using the metadata acquired from the decoder 120 and store it in a storage (not illustrated). In addition, the HDR processor 133 may generate an HDR image by using the HDR information obtained using the metadata with respect to the image signal as rendering information. The HDR image rendering information may include, as mandatory HDR information, the minimum and maximum brightness information for each scene or frame, color specification information including a color gamut and color temperature of the image, and a transfer parameter including a contrast enhancement (CE) control parameter. In addition, the HDR image rendering information may selectively include at least one from among the histogram information representing information relating to the lowest, highest and most-frequent pixel value, sharpness information representing information relating to a boundary area intensity of the image, and the information relating to a correlation between scenes or between frames, as optional HDR information In addition, the HDR processor 133 may generate HDR backlight information by using the HDR image. In addition, the HDR processor 133 may adjust the HDR image by using the HDR backlight information. In addition, the HDR processor 133 may display the adjusted HDR image by using an image output interface (not illustrated).

In addition, the HDR processor 133 may adjust the generated HDR backlight information by using the HDR information either stored in the storage (not illustrated) or acquired using the metadata acquired from the decoder 120 as dimming information. In this regard, the backlight dimming information may include backlight peak information including a backlight unit luminance mapping parameter for each screen or frame as mandatory HDR information. In addition, the backlight dimming information may further selectively include scene information including surrounding environment information of a timeline of scenes or frames, and backlight characteristic information.

In addition, the HDR processor 133 may identify the backlight luminance for expressing an optimum dynamic range of the display apparatus 100 for the HDR image. For example, the backlight luminance of the corresponding area may be adjusted so that the luminance of the black area and peak area of the image displayed using the max/min luminance value and the histogram information becomes the maximum luminance and the minimum luminance, respectively. In other words, the HDR processor 133 may generate a luminance control signal (dimming signal) of a backlight according to the luminance information. When the backlight luminance is identified, the HDR processor 133 may calculate a final output image.

Figure 3:
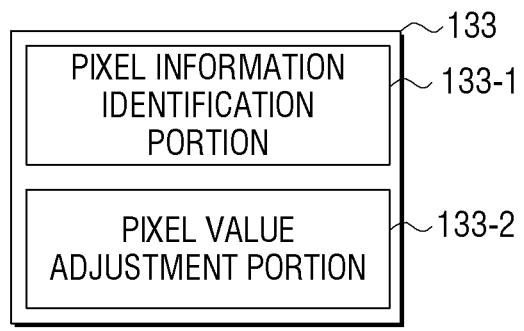
FIG. 3 is a block diagram schematically illustrating the configuration of a portion for acquiring information relating to an area of interest, according to an example embodiment.

Referring to FIG. 3, the HDR processor 133 includes a pixel information identification portion 133-1 and a pixel value adjustment portion 133-2.

The pixel information identification portion 133-1 may identify information of a pixel of an area corresponding to an area of interest. For example, the pixel information identification portion 133-1 may identify which area from among the front view, background and the mixed area of the front view and the background each of the pixels of an area corresponding to the area of interest corresponds to, using color range information relating to the front view and background included in the area of interest acquired from the acquisition portion of information relating to an area of interest 131.

For example, when the color range information of the front view is between 0 and 115 and the color range information relating to the background is between 80 and 255, the pixel information identification portion 133-1 may identify that the color range information relating to the mixed area of the front view and the background is in the range of 80 and 115. In addition, the pixel information identification portion 133-1 may identify which area from among the front view, the background and the mixed area of the front view and the background each of the pixels included in the area of interest corresponds to. For example, when the pixel value of a first pixel included in the area of interest is 25, the pixel information identification portion 133-1 may identify that the first pixel is a pixel corresponding to the front view. In addition, when the pixel value of a second pixel included in the area of interest is 100, the pixel information identification portion 133-1 may identify that the second pixel is a pixel corresponding to the mixed area of the front view and the background. In addition, when the pixel value of a third pixel included in the area of interest is 200, the pixel information identification portion 133-1 may identify that the third pixel is a pixel corresponding to the background. Meanwhile, the color range information may be range information of at least one from among R, G, B and maxRGB.

The pixel value adjustment portion 133-2 may adjust each pixel value based on the pixel information identified in the pixel information identification portion 133-1. For example, the pixel value adjustment portion 133-2 may adjust a pixel value by performing at least one from among a tone mapping and a saturation mapping using different parameters with respect to the pixel corresponding to the front view, the pixel corresponding to the background and the pixel corresponding to the mixed area of the front view and the background. For example, the pixel value adjustment portion 133-2 may perform at least one from among a tone mapping and a saturation mapping using a particular parameter with respect to the pixel corresponding to the front view, and may perform at least one from among a global tone mapping and a saturation mapping with respect to the pixel corresponding to the background.

Figure 4:
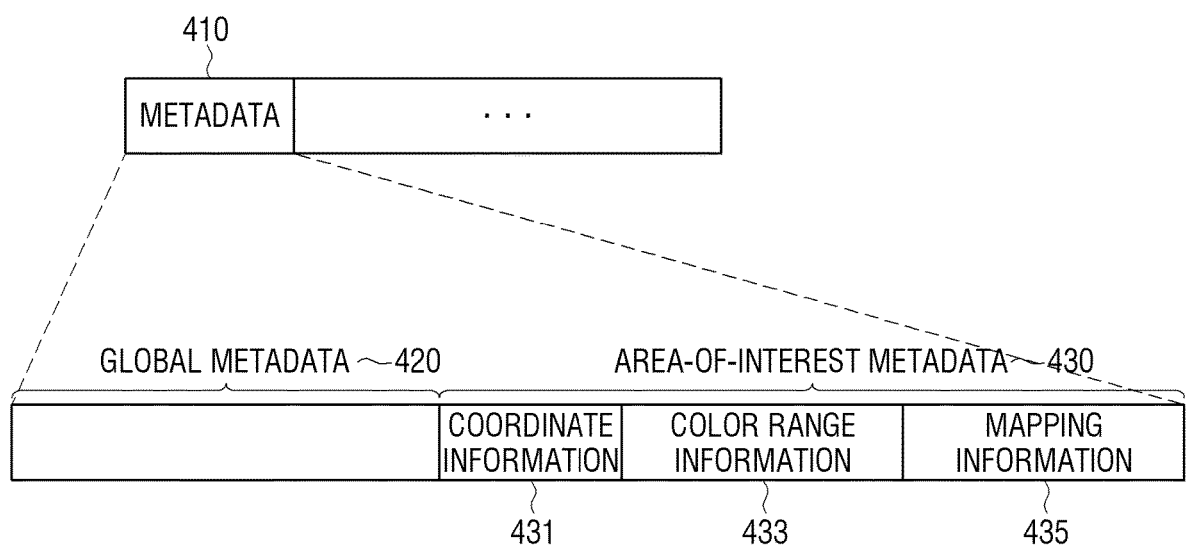
FIGS. 4, 5A, 5B, 5C, 5D, 6A, 6B, 7A, 7B, 8 and 9 are diagrams illustrating various example embodiments to perform an HDR processing with respect to the area of interest by using the information relating to the area of interest of the display apparatus, according to various example embodiments.

According to an example embodiment, FIG. 4 illustrates a packet or bit stream received from an external device via the image receiver 110. The image packet or the bit stream may include metadata 410. In addition, the metadata 410 may include global metadata 420 including information relating to the entire area and area-of-interest metadata 430 including information relating to the area of interest. In addition, the area-of-interest metadata 430 may include information 431 relating to a coordinate representing an area of interest, color range information 433 of the area of interest, and mapping information 435. Meanwhile, although FIG. 4 does not illustrate the global metadata in detail, the global metadata 420 may include color range information, mapping information, and the like.

Figure 5A:
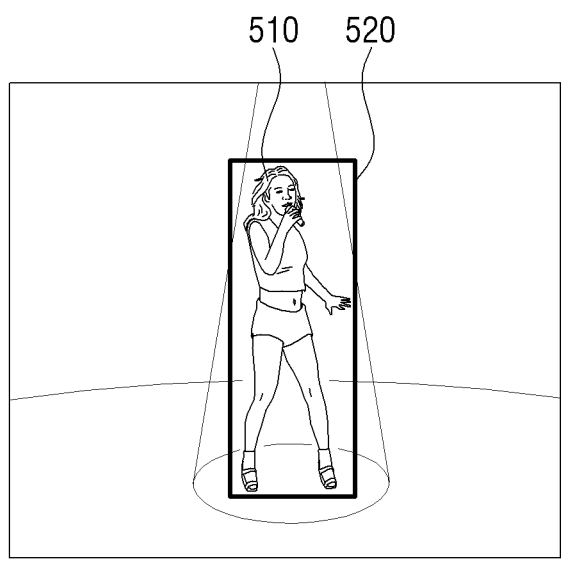

The area of interest may be of various shapes as illustrated in FIGS. 5A, 5B, 5C and 5D according to various example embodiments. The area of interest may be an area including a main object. For example, as illustrated in FIG. 5A, an area of interest 520 may have the shape of a rectangle including an object 510. In addition, a coordinate representing the area of interest may be [(Xmin,Ymin), (Xmax,Ymax)}.

Figure 5B:
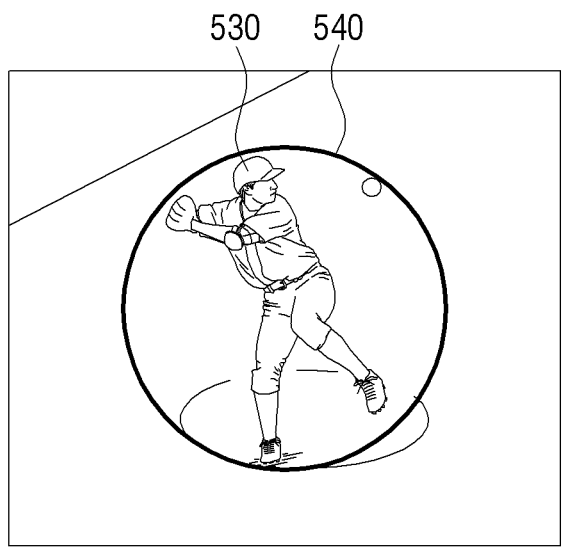

Alternatively, as illustrated in FIG. 5B, the area of interest 540 may have the shape of a circle including an object 530. When the area of interest 540 has the shape of a circle, a coordinate representing the area of interest 540 may be [(x,y), r].

Figure 5C:
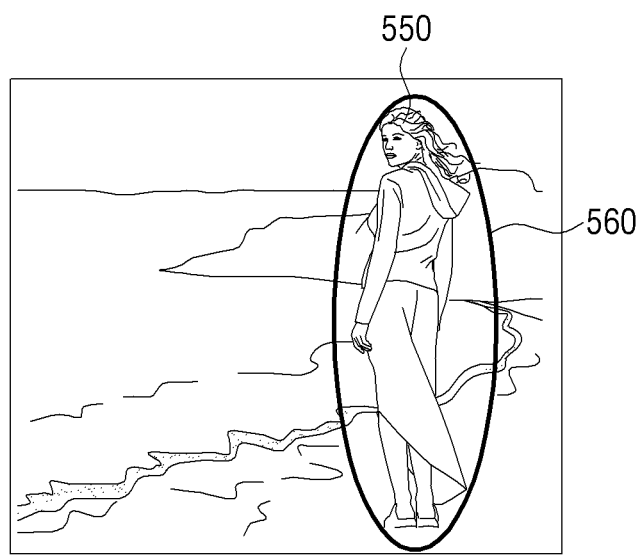

Alternatively, as illustrated in FIG. 5C, an area of interest 560 may have the shape of an oval including an object 550. When the area of interest 560 has the shape of an oval, a coordinate representing the area of interest 560 may be [(x,y), a, b].

Figure 5D:
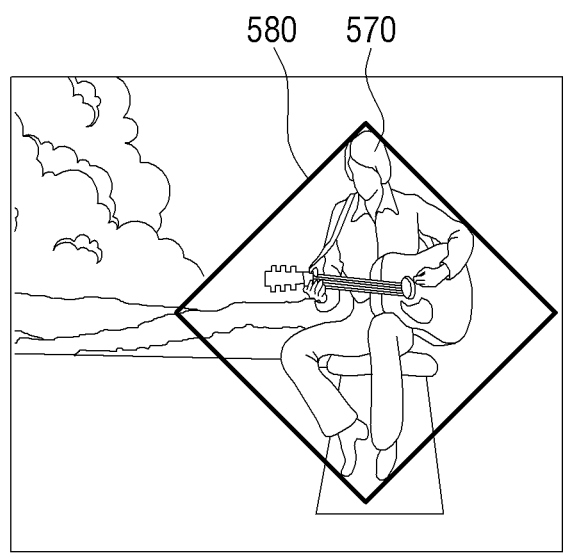

Alternatively, as illustrated in FIG. 5D, an area of interest 580 may have the shape of a diamond including an object 570. When the area of interest 580 has the shape of a diamond, a coordinate representing the area of interest 580 may be [(x1,y1),(x2,y2),(x3,y3),(x4,y4)].

As described above, the areas of interest 520, 540, 560 and 580 may be designated as a minimum area including the main objects 510, 530, 550 and 570 according to shapes of the main objects 510, 530, 550 and 570 by the user when the image data is generated.

Figure 6A:
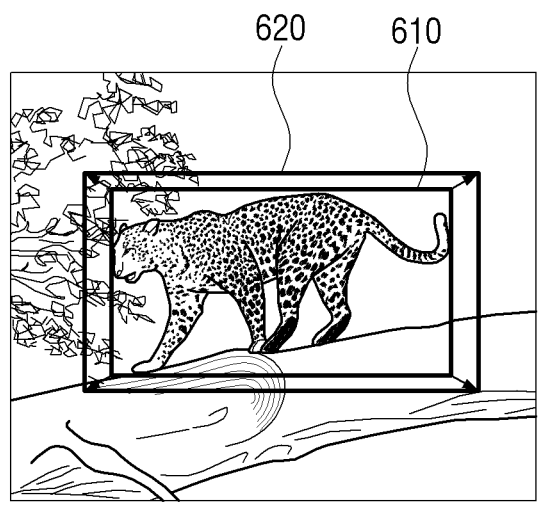
Figure 6B:
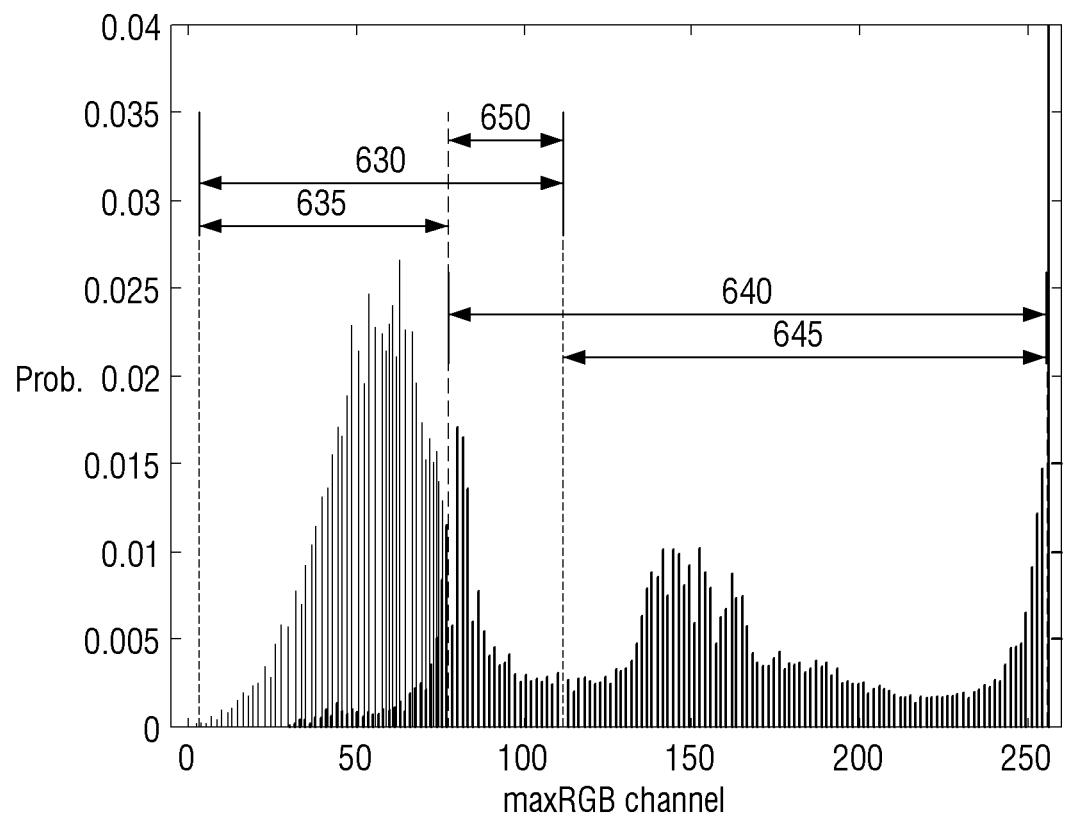

A method of acquiring information relating to a pixel will be described below with reference to FIGS. 6A and 6B.

An HDR processor 133 may acquire color range information relating to a front view 610, a background 620, and a mixed area of the front view 610 and the background 620 based on metadata relating to the area of interest. For example, the HDR processor 133 may acquire information relating to a color range 630 of the front view 610 and information relating to a color range 640 of the background 620 based on metadata information relating to the area of interest. In addition, the HDR processor 133 may acquire a range 650 in which the color range 630 of the front view 610 and the color range 640 of the background 620 are overlapped with each other as range information of a mixed area of the front view and the background.

For example, in a case where a pixel value of a first pixel included in an area of interest corresponds to a color range 635 of the front view, the HDR processor 133 may identify that the first pixel corresponds to the front view. In addition, in a case where a pixel value of a second pixel included in an area of interest corresponds to a color range 645 of the background, the HDR processor 133 may identify that the second pixel corresponds to the background. In addition, in a case where a pixel value of a third pixel included in an area of interest corresponds to a color range 650 of the mixed area of the front view and the background, the HDR processor 133 may identify that the second pixel corresponds to the mixed area of the front view and the background.

When it is identified as to which area from among the front view, the background and the mixed area of the front view and the background a pixel corresponding to the area of interest belongs to, the HDR processor 133 may perform at least one from among a tone mapping or a saturation mapping using a different parameter according to the identified area.

Hereinafter, an example embodiment of performing a tone mapping and a saturation mapping with respect to an area of interest will be described with reference to FIGS. 7A, 7B, 8 and 9.

Figure 7A:
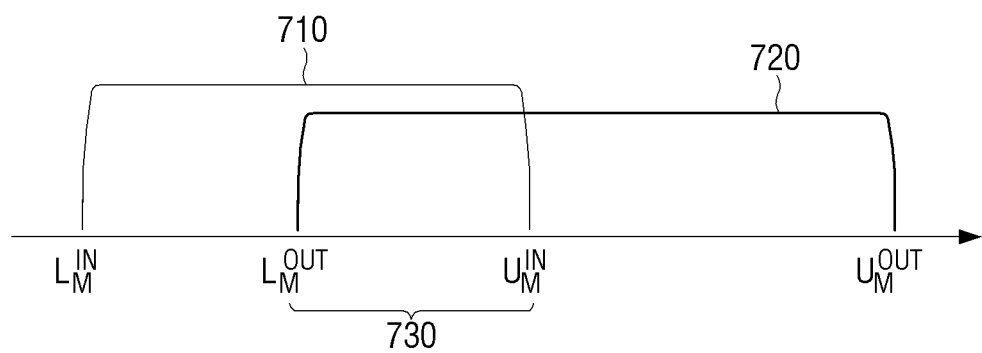

First, the HDR processor 133 may perform at least one from among a tone mapping or a saturation mapping according to which area from among a front view, a background and a mixed area of the front view and the background each pixel belongs to based on information relating to a pixel. For example, as illustrated in FIG. 7A, the HDR processor 133 may calculate a parameter value of a front view, a background or a mixed area of the front view and the background by using color range information included in metadata. For example, the HDR processor 133 may identify an area [Lm(out), Um(in)] 730 included in both a color range [Lm(in), Um(in)] 710 of the front view and a color range [Lm(in), Um(in)] 720 relating to the background as a mixed area of the front view and the background based on the color range information included in the metadata. Although FIG. 7A illustrates that a front view, a background or a mixed area of the front view and the background is identified using the color range information included in the metadata, the front view, the background or the mixed area of the front view and the background may be identified using color range information and the like. In addition, the color range information may be range information of each of red (R), green (G) and blue (B) and maxRGB range information, or may be based on range information of at least two from among the red (R), the green (G), the blue (B), and the maxRGB.

Figure 7B:
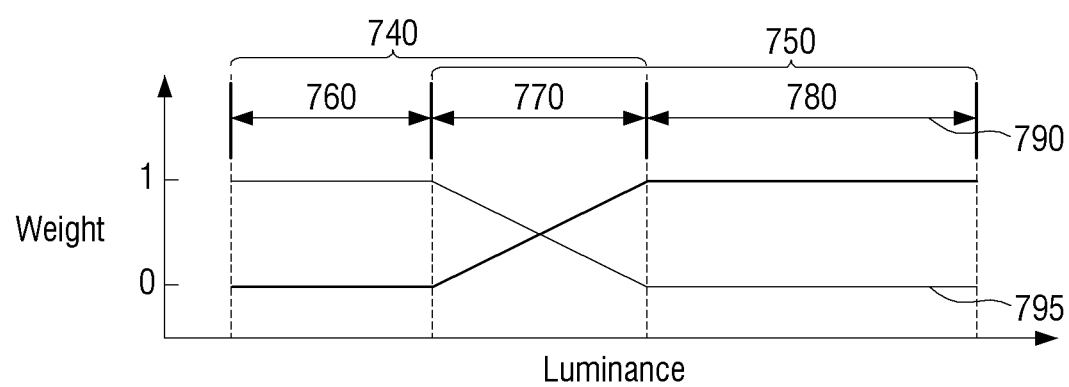

In addition, the HDR processor 133 may differently calculate a parameter value according to an area to which each pixel corresponds. For example, as illustrated in FIG. 7B, an area corresponding to a front view may have a front view parameter value 795 of 1 and a background parameter value 790 of 0. In addition, an area 780 corresponding to a background may have a front view parameter value of 0 and a background parameter value of 1. In addition, a front view parameter value 795 and background parameter value of an area 770 corresponding to a mixed area of the front view and the background may be variable depending on the luminance value. When a tone mapping or a saturation mapping is performed, it may affect both the front view parameter value 795 and the background parameter value 790. Although FIG. 7B illustrates that the front view parameter value 795 and background parameter value 790 of an area 770 correspond-ing to a mixed area of the front view and the background are linearly varied depending on the luminance value, this is only an example. It is possible that the values 795 and 790 are non-linearly varied.

Figure 8:
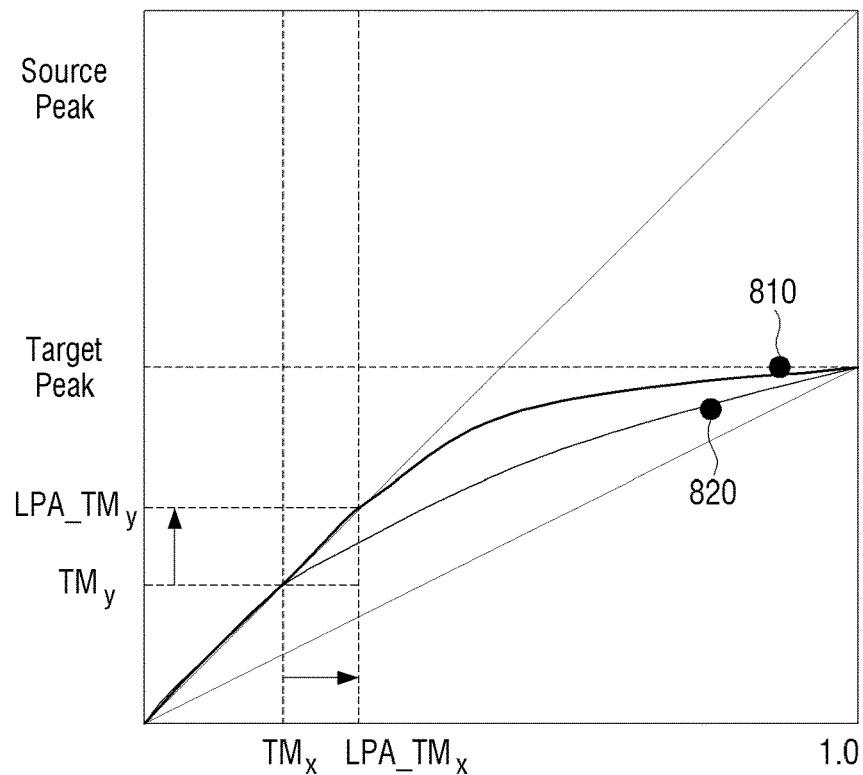
Figure 8:
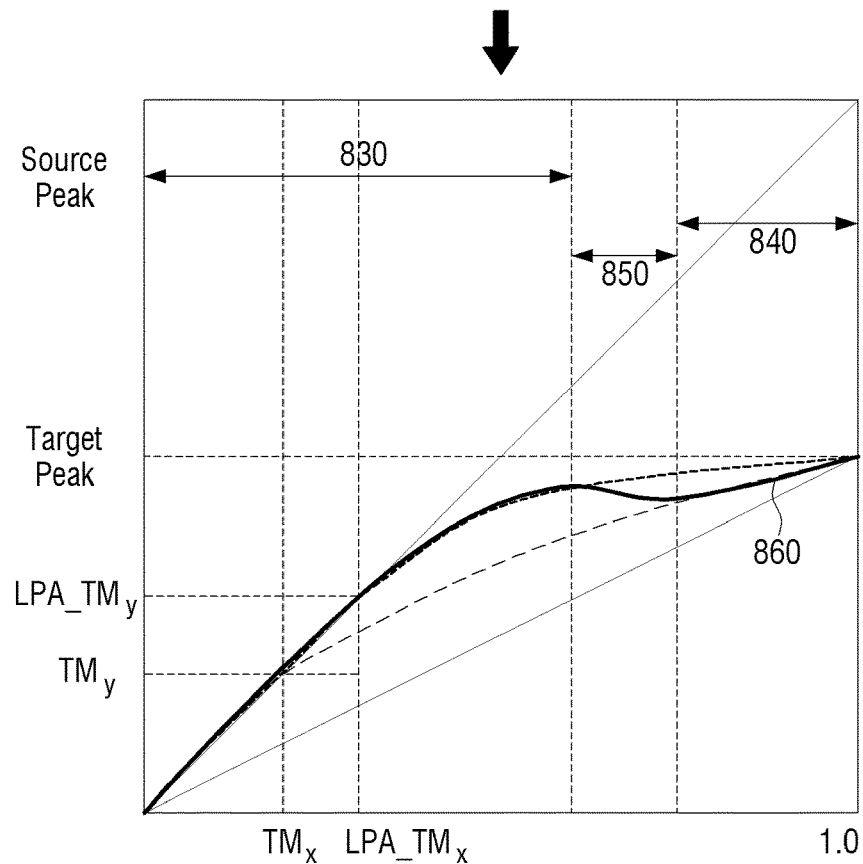

FIG. 8 is a diagram illustrating a method for performing a tone mapping based on a parameter calculated in FIGS. 7A and 7B, according to an example embodiment. For example, the HDR processor 133 may perform a tone mapping by using the same equation as Mathematical formula 1.

(Mathematical formula 1)

$$g_{STM}^i = \begin{cases} g_{STM}^F(X_M^i) * W^F(X_M^i) + g_{STM}^B(X_M^i) * W^B(X_M^i), & p_i = 2(MX) \\ g_{STM}^F(X_M^i), & p_i = 1(FG) \\ g_{STM}^B(X_M^i), & p_i = 0(BG) \end{cases}$$

Here, the $g_{STM}^i$ is a tone mapping value of pixel I, and $w^F(x_M^i)$ is a front view parameter value, and $w^B(x_M^i)$ is a background parameter value. That is, when a tone mapping value is calculated by substituting with the calculated front view parameter and the calculated background parameter value, the tone mapping value equals to a value of tone 810 of the front view in the front view area 830 and equals to a value of tone 820 of a background in the background area 840. In the mixed area 850 of the front view and the background, it may be understood that a new tone mapping value is calculated by the front view parameter value and the background parameter value.

Figure 9:
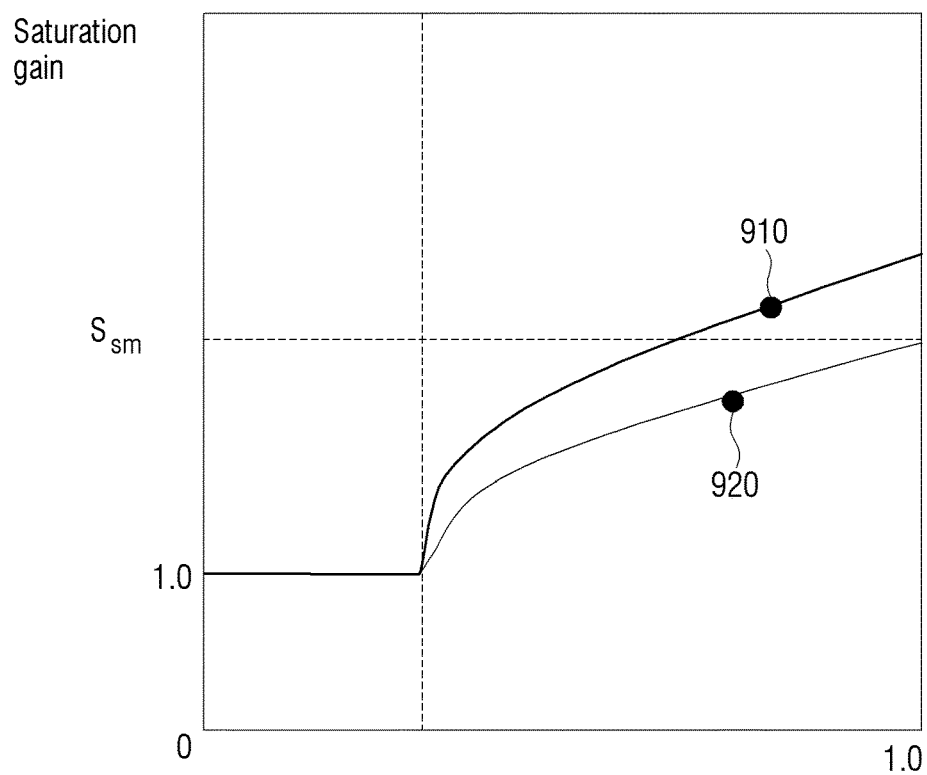
Figure 9:
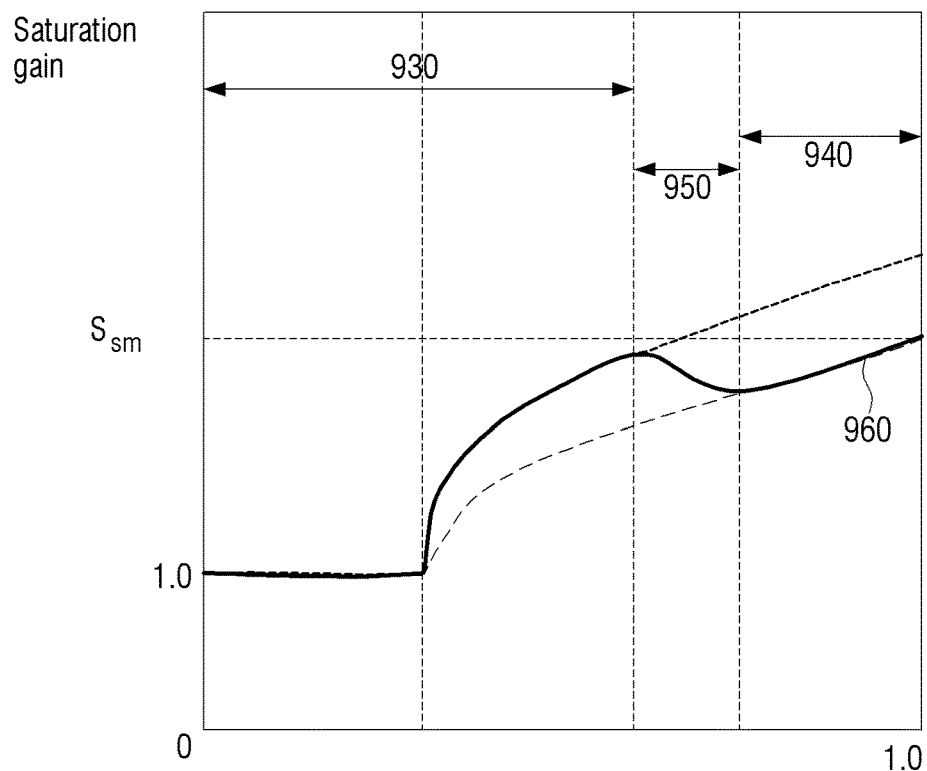

FIG. 9 is a diagram illustrating a method for performing a saturation mapping based on a parameter calculated in FIGS. 7A and 7B, according to an example embodiment.

[Mathematical formula 2]

$$g_{STM}^i = \begin{cases} g_{STM}^F(X_M^i) * W^F(X_M^i) + g_{STM}^B(X_M^i) * W^B(X_M^i), & p_i = 2(MX) \\ g_{STM}^F(X_M^i), & p_i = 1(FG) \\ g_{STM}^B(X_M^i), & p_i = 0(BG) \end{cases}$$

Here, the $g_{STM}^i$ is a tone mapping value of pixel I, and $w^F(x_M^i)$ is a front view parameter value, and $w^B(x_M^i)$ is a background parameter value. That is, when a tone mapping value is calculated by substituting with the calculated front view parameter and the calculated background parameter value, the tone mapping value equals to a value of tone 910 of the front view in the front view area 930 and equals to a value of tone 920 of a background in the background area 940. In the mixed area 950 of the front view and the background, it may be understood that a new tone mapping value is calculated by the front view parameter value and the background parameter value.

The HDR processor 133 may generate an image of higher resolution by classifying into a front view, a background and a mixed area of the front view and the background and performing a tone mapping and a saturation mapping using the method described above.

Figure 10:
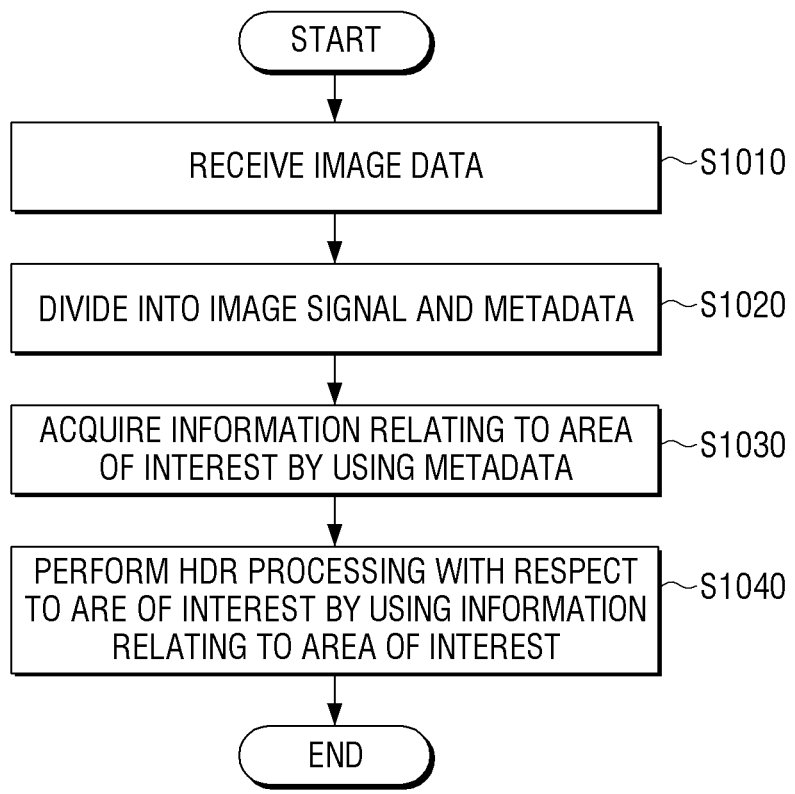
FIG. 10 is a flowchart illustrating a method of controlling a display apparatus, according to an example embodiment.

Hereinafter, a method of controlling the display apparatus 100 according to an example embodiment of the present disclosure will be described with reference to FIG. 10.

The display apparatus 100 receives an image data from an external source, at operation S1010.

In addition, the display device 100 divides the received image data into an image signal and metadata, at operation S1020. For example, in response to an image data including metadata being received, the display apparatus 100 may parse a message included in the received image data and acquire metadata. In addition, the display apparatus 100 may separate a metadata with respect to the entire area and a metadata with respect to an area of interest from the acquired metadata.

In addition, the display apparatus 100 may acquire information relating to an area of interest using the metadata, at operation S1030. For example, the display apparatus 100 may identify which area from among a front view, a background and a mixed area of the front view and the background a pixel included in the area of interest corresponds to, using color range information relating to the front view, the background and the mixed area of the front view and the background included in the area of interest included in the metadata.

In addition, the display apparatus 100 performs an HDR processing with respect to the area of interest by using the acquired information relating to the area of interest, at operation S1040. For example, the display apparatus 100 may perform an HDR processing with respect to an area of interest by performing at least one from among a tone mapping and a saturation mapping using a parameter corresponding to a front view, a parameter corresponding to a background, a parameter corresponding to a mixed area of the front view and the background based on which area from among the front view, the background, and the mixed area of the front view and the background a pixel included in the area of interest corresponds to.

Meanwhile, the above-described method may be implemented as a program that may be executed by a computer and may be implemented in a general-purpose digital computer that operates the program using a computer-readable recording medium. In addition, the structure of the data used in the above-described method may be recorded on a computer-readable recording medium by various means. The non-transitory computer-readable medium may include storage medium such as a magnetic storage medium (e.g., ROM, floppy disc, a hard disc, and the like) or an optical readable medium (e.g., a compact disc (CD), a digital versatile disc (DVD), and the like).

Those skilled in the art to which the present disclosure pertains will appreciate that the present disclosure may be implemented in a modified shape, without departing from the scope and spirit of the disclosure as defined in the accompanying claims. Therefore, the methods disclosed herein should be considered in an illustrative aspect rather than a restrictive aspect. The scope of the present disclosure should be defined by the following claims rather than the above-mentioned description, and all technical spirits equivalent to the following claims should be interpreted as being included in the present disclosure.

What is claimed is:

1. A method of controlling a display apparatus which processes and displays an image signal, the method comprising:
    receiving an image data;
    dividing the received image data into an image signal and a metadata;
    acquiring information relating to an area of interest from the metadata; and
    performing a high dynamic range (HDR) processing on the area of interest based on the information relating to the area of interest,
    wherein the information relating to the area of interest comprises a coordinate corresponding to the area of interest and color range information relating to a front view and a background included in the area of interest, and
    wherein the performing the HDR processing comprises performing at least one from among a tone mapping and a saturation mapping using a parameter corresponding to the front view and a different parameter corresponding to the background.

2. The method as claimed in claim 1, wherein the performing the HDR processing comprises:
    identifying relating to a plurality of pixels included in the area of interest by using color range information relating to a front view and background included in the area of interest; and
    adjusting a plurality of pixel values included in the area of interest according to information relating to the plurality of pixels.

3. The method as claimed in claim 2, wherein the information relating to the pixel includes information indicating which group from among a first group corresponding to a background, a second group corresponding to a front view, and a third group corresponding to a mixture of a front view and a background the plurality of pixels belong to.

4. The method as claimed in claim 2, wherein the adjusting the plurality of pixel values comprises adjusting at least one from among a tone or a saturation by performing at least one from among a tone mapping and a saturation mapping with respect to the plurality of pixels.

5. The method as claimed in claim 1, wherein the coordinate corresponding to the area of interest is a coordinate with respect to a predetermined shape including a main object of the image data.

6. The method as claimed in claim 1, wherein the coordinate corresponding to the area of interest is a coordinate with respect to a shape generated by enlarging a predetermined shape including a main object of the image data by a predetermined ratio.

7. The method as claimed in claim 1, wherein the color range information includes information relating to a range of at least one of maxRGB, red (R), green (G), and blue (B).

8. A display apparatus which processes and displays an image signal, comprising:
    an image receiver configured to receive an image data;
    a decoder configured to divide the received image data into an image signal and metadata; and
    an image processor configured to acquire information relating to an area of interest from the metadata and to perform a high dynamic range (HDR) processing on the area of interest based on the information relating to the area of interest,
    wherein the information relating to the area of interest comprises a coordinate corresponding to the area of interest and color range information relating to a front view and a background included in the area of interest, and
    wherein the image processor is configured to perform at least one from among a tone mapping and a saturation mapping using a parameter corresponding to the front view and a different parameter corresponding to the background.

9. The display apparatus as claimed in claim 8, wherein the image processor is further configured to identify information relating to a plurality of pixels included in the area of interest by using color range information relating to a front view and background included in the area of interest, and to adjust a plurality of pixel values included in the area of interest according to information relating to the plurality of pixels.

10. The display apparatus as claimed in claim 9, wherein the information relating to the pixel includes information indicating which group from among a first group corresponding to a background, a second group corresponding to a front view, and a third group corresponding to a mixture of a front view and a background the plurality of pixels belong to.

11. The display apparatus as claimed in claim 9, wherein the image processor adjusts at least one from among a tone and a saturation by performing at least one from among a tone mapping and a saturation mapping with respect to the plurality of pixels.

12. The display apparatus as claimed in claim 8, wherein the coordinate corresponding to the area of interest is a coordinate with respect to a predetermined shape including a main object of the image data.

13. The display apparatus as claimed in claim 8, wherein the coordinate corresponding to the area of interest is a coordinate with respect to a shape generated by enlarging a predetermined shape including a main object of the image data by a predetermined ratio.

* * * * *